(12) United States Patent
Gonzalez Martin et al.

(10) Patent No.: US 11,780,169 B2
(45) Date of Patent: Oct. 10, 2023

(54) VIRTUAL OBJECT VOLUMES

(71) Applicant: Hewlett-Packard Development Company, L.P., Spring, TX (US)

(72) Inventors: Sergio Gonzalez Martin, Sant Cugat del Valles (ES); Jordi Roca Vila, Sant Cugat del Valles (ES); Scott White, Boise, ID (US); Jordi Gonzalez Rogel, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,223

(22) PCT Filed: Mar. 9, 2018

(86) PCT No.: PCT/US2018/021774
§ 371 (c)(1),
(2) Date: Oct. 15, 2019

(87) PCT Pub. No.: WO2019/172935
PCT Pub. Date: Sep. 12, 2019

(65) Prior Publication Data
US 2020/0406557 A1   Dec. 31, 2020

(51) Int. Cl.
G06F 19/00 (2018.01)
B29C 64/393 (2017.01)
B33Y 10/00 (2015.01)
B33Y 30/00 (2015.01)
B33Y 50/02 (2015.01)
(Continued)

(52) U.S. Cl.
CPC ............ *B29C 64/393* (2017.08); *B22F 10/10* (2021.01); *B22F 10/80* (2021.01); *B28B 1/001* (2013.01); *B33Y 10/00* (2014.12); *B33Y 30/00* (2014.12); *B33Y 50/02* (2014.12);
(Continued)

(58) Field of Classification Search
CPC .......... B22F 10/10; B22F 3/008; B28B 1/001; B29C 64/393; B29K 2077/00; B33Y 10/00; B33Y 30/00; B33Y 50/00; B33Y 50/02; G05B 19/4099; G05B 2219/49023; Y02P 10/25
See application file for complete search history.

(56) References Cited

U.S. PATENT DOCUMENTS 6,936,212 B1   8/2005   Crawford
2008/0118655 A1   5/2008   Kritchman
(Continued)

FOREIGN PATENT DOCUMENTS

CN          105936678        9/2016
WO   WO2016010590 A1   1/2016
(Continued)

*Primary Examiner* — Zhipeng Wang
(74) *Attorney, Agent, or Firm* — Michael Dryja

(57) ABSTRACT

In an example, a method includes receiving, at a processor, an indication of a volume of a fabrication chamber and determining a characteristic of a build material for use in fabricating an object within the fabrication chamber. Based on the build material characteristic, a virtual object volume within the fabrication chamber may be determined, wherein the virtual object volume provides a virtual boundary within which to position virtual objects representing objects to be generated in the fabrication chamber.

17 Claims, 4 Drawing Sheets

(51) Int. Cl.
 B22F 10/10 (2021.01)
 B28B 1/00 (2006.01)
 G05B 19/4099 (2006.01)
 B22F 10/80 (2021.01)
 B29K 77/00 (2006.01)

(52) U.S. Cl.
 CPC ...... *G05B 19/4099* (2013.01); *B29K 2077/00* (2013.01); *G05B 2219/49023* (2013.01)

(56) References Cited

U.S. PATENT DOCUMENTS

| | | |
|---|---|---|
| 2016/0096327 A1 | 4/2016 | Fry et al. |
| 2017/0056967 A1 | 3/2017 | Fulop et al. |
| 2017/0113414 A1* | 4/2017 | Zeng .................... B29C 64/393 |
| 2017/0120335 A1 | 5/2017 | Demuth et al. |
| 2017/0129184 A1 | 5/2017 | Buller et al. |
| 2017/0173888 A1* | 6/2017 | Thomas-Lepore .... B33Y 50/02 |
| 2017/0173889 A1* | 6/2017 | Thomas-Lepore ......................... G05B 19/4099 |
| 2017/0203515 A1 | 7/2017 | Bennett et al. |
| 2018/0001567 A1* | 1/2018 | Juan ...................... B33Y 50/02 |
| 2018/0071819 A1* | 3/2018 | Connor ................. B33Y 50/02 |
| 2018/0200955 A1* | 7/2018 | Hoelldorfer .......... B29C 64/209 |

FOREIGN PATENT DOCUMENTS

| | | |
|---|---|---|
| WO | WO2017196350 A1 | 11/2017 |
| WO | WO2018004336 A1 | 1/2018 |

\* cited by examiner

VIRTUAL OBJECT VOLUMES

BACKGROUND

Three-dimensional objects generated by an additive manufacturing process may be formed in a layer-by-layer manner. In one example of additive manufacturing, an object is generated by solidifying portions of layers of build material. In examples, the build material may be in the form of a powder, liquid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used to solidify a build material. In other examples, three-dimensional objects may be generated by using extruded materials such as plastics or sprayed materials as build materials, which solidify to form an object.

BRIEF DESCRIPTION OF DRAWINGS

For a more complete understanding, reference is now made to the following description taken in conjunction with the accompanying drawings in which.

DETAILED DESCRIPTION

Figure 1:
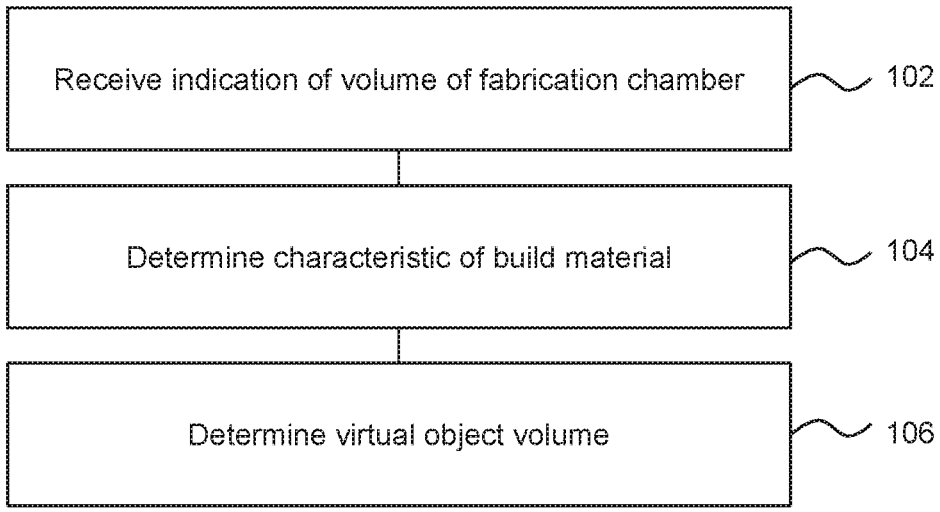
FIG. 1 is a flowchart of an example method of determining a virtual object volume.

Some examples described herein provide an apparatus and a method for processing data relating to a three dimensional object and/or for generating data that may be used to produce a three dimensional object.

Some printing processes that generate three-dimensional objects use data generated from a model of a three-dimensional object. This data may, for example, specify the locations at which to apply an agent to the build material, or where a build material itself may be placed, and the amount (s) to be placed. The data may be generated from a 3D representation of an object to be printed.

During a particular printing process or print job, multiple three dimensional objects may be generated (printed or fabricated) within a fabrication chamber or build volume of a printer apparatus.

Some 3D printing technology works by generating layers of a given thickness, one on top of another. Build material may be deposited, for example, on a print bed, and processed layer by layer, for example within a fabrication chamber or "build volume" of the printer. The build material may be a powder-like granular material, which may for example be a plastic, ceramic or metal powder. According to one example, a suitable build material may be PA12 build material commercially known as V1R10A "HP PA12" available from HP Inc.

In some examples, at least one print agent may be selectively applied to the build material, and may be liquid when applied. For example, a fusing agent (also termed a "coalescence agent" or "coalescing agent") may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern.

According to one example, a suitable fusing agent may be an ink-type formulation comprising carbon black, such as, for example, the fusing agent formulation commercially known as V1Q60Q "HP fusing agent" available from HP Inc. In one example such a fusing agent may additionally comprise an infra-red light absorber. In one example such a fusing agent may additionally comprise a near infra-red light absorber. In one example such a fusing agent may additionally comprise a visible light absorber. In one example such a fusing agent may additionally comprise a UV light absorber. Examples of print agents comprising visible light enhancers are dye based colored ink and pigment based colored ink, such as inks commercially known as CE039A and CE042A available from HP Inc.

In other examples, coalescence may be achieved in some other manner.

In some examples, a detailing agent may also be used (also termed a "coalescence modifier agent" or "coalescing modifier agent"), which may have a cooling effect. In some examples, the detailing agent may be used near edge surfaces of an object being printed. According to one example, a suitable detailing agent may be a formulation commercially known as V1Q61A "HP detailing agent" available from HP Inc.

In processing data for object generation, a 'virtual' fabrication chamber or build volume may be modelled, into which one or more virtual object (i.e. representations of objects to be generated) may be placed.

In some examples, the entirety of the volume of the fabrication chamber is not available when planning where and how objects are to be positioned based on object models. Instead, an 'accessible' volume of a fabrication chamber may be defined. An accessible volume may allow for compensation for the shrinkage which may occur when an object is generated, as follows.

In some examples, virtual objects may be scaled prior to generation of printing instructions to compensate for subsequent shrinkage. Once the object or objects are formed, or during their formation, as an object cools and the build material solidifies forming the final object or objects, the printed objects can undergo from shrinkage. This shrinkage may be dependent on the type of build material, cooling rate and/or print agent used. This shrinkage means that, unless compensation for shrinkage is applied, a final printed object may not represent the object as described by the object model data received by the printer.

Therefore, in some examples, a compensation or scaling is applied to object model data in order to compensate for the shrinking of objects that may occur, for example, after or during printing. In other words, in some examples the objects are printed larger than the model originally specified (in some examples, larger by a predetermined factor) such that, after shrinkage, they are the size specified in the original object model data.

To allow for this, when a user is placing a virtual (unscaled) object having the intended dimensions of the object to be fabricated in a virtual fabrication chamber, this may be confined to a volume which, when scaled, is still within a usable build volume of the fabrication chamber. Thus, a virtual object volume may define a volume within a fabrication chamber in which an (unscaled) virtual object can be placed.

FIG. 1 is an example of a method, which may be a method of determining a virtual object volume, and which may be computer implemented. The method of FIG. 1 may be performed, for example, by a three dimensional printer or an additive manufacturing apparatus (which terms are used interchangeably herein) and/or by a program separate therefrom. In some examples, the virtual object volume may be presented to a user via a web-based interface, and/or the method of FIG. 1 may be provided by machine executable instructions deployed as a 'web application'.

The method comprises, in block 102, receiving at a processor an indication of a volume of a fabrication chamber. For example, this may comprise a data file stating coordinates of the fabrication chamber. In one example, one corner of the fabrication chamber is set as the origin and the coordinates of the most distant corner are provided. In some examples, this may fully define a cuboid build chamber. In some examples, the coordinates may be associated with a unit, for example microns, millimetres or some other unit. In some examples, such data may be sent from an additive manufacturing apparatus, retrieved from a memory and/or supplied by a user. In one example, data may be provided from an additive manufacturing apparatus in a machine readable format, such as xml (or another mark-up language), JavaScript Object Notation (JSON), or the like.

Block 104 comprises determining, by the processor, a characteristic of a build material (which may in this example include print agents) for use in fabricating an object within the fabrication chamber. For example, the characteristic may comprise the type and/or variant of build material. For example, build materials may comprise granular materials formed of polyamide 12 (PA12), polyamide 11 (PA11), polypropylene or the like. Within each of these materials, there may be variations, for example additives, proportions of recycled material, grain size and/or distribution. In some examples, the characteristic may be a characteristic of the build material when used with a particular print agent. In some examples, the characteristic may be an indication of the shrinkage of the build material, which may for example be in the form of a percentage or the like. One or more of such characteristics may be provided to the processor. In some examples, the characteristic(s) may be sent from an additive manufacturing apparatus, retrieved from a memory and/or supplied by a user.

In a particular example, a user may select a build material (and in some examples, a print agent) from a menu in a graphic user interface, for example in a web-based application, and this may directly provide the characteristic, and/or may allow a characteristic to be determined or derived, for example through a data look-up operation. In some examples, the data may be held in a memory of a container of build material, and supplied directly or indirectly therefrom. In some examples, the look-up operation may be carried out by processing circuitry of an additive manufacturing apparatus.

Block 106 comprises determining, by the processor, a virtual object volume within the fabrication chamber based on the build material characteristic(s), wherein the virtual object volume provides a virtual boundary within which to position virtual objects representing objects to be generated in the fabrication chamber.

Therefore, when considering a model of the object to be generated, this virtual object may be confined to a smaller volume of a fabrication chamber. While the object may be generated in a first volume, by the time it has undergone shrinkage, it may in fact occupy a second smaller volume of the fabrication chamber. The model for the object is therefore confined to this second smaller volume to allow for scaling (enlargement) of the model which in turn is to compensate for the shrinkage.

The method of FIG. 1 allows different virtual object volumes to be determined based on different build material characteristics. The alternative may be to size the virtual object volume for a 'worst case scenario' for currently used build materials. For example, a 'worst case scenario' virtual object volume may allow for a 5% shrinkage in build material (or more specifically for an object/virtual build volume which is scaled up to account for a 5% shrinkage), whereas particular build materials may exhibit less shrinkage. For example, PA12 may be associated with a 2.5-3% shrinkage. Therefore, a 'worst case scenario' virtual object volume may unnecessarily exclude regions of the fabrication chamber when forming an object from PA12, which in turn means that object generation is more confined, and space in the fabrication chamber may be wasted.

Therefore, in this example, there may be one accessible object volume for a first material (e.g. PA12), another for a second material (e.g. PA11), etc. In some examples, variations of such accessible object volumes may be defined the different variations of these formulations. Of course, other build materials may be used in other examples.

There may be other reasons for specifying different accessible object volumes. For example, certain areas of a fabrication chamber may occasionally or frequently result in fabrication errors associated with a particular build material and such areas could be excluded from use by defining a smaller accessible object volume. In other examples, increasing the distance from a fabrication chamber wall may result in an object with better dimensional tolerance characteristics as the object fabrication temperature may be more stable. To benefit from this, a smaller virtual object volume may be defined when dimensional accuracy is of high priority.

Figure 2:
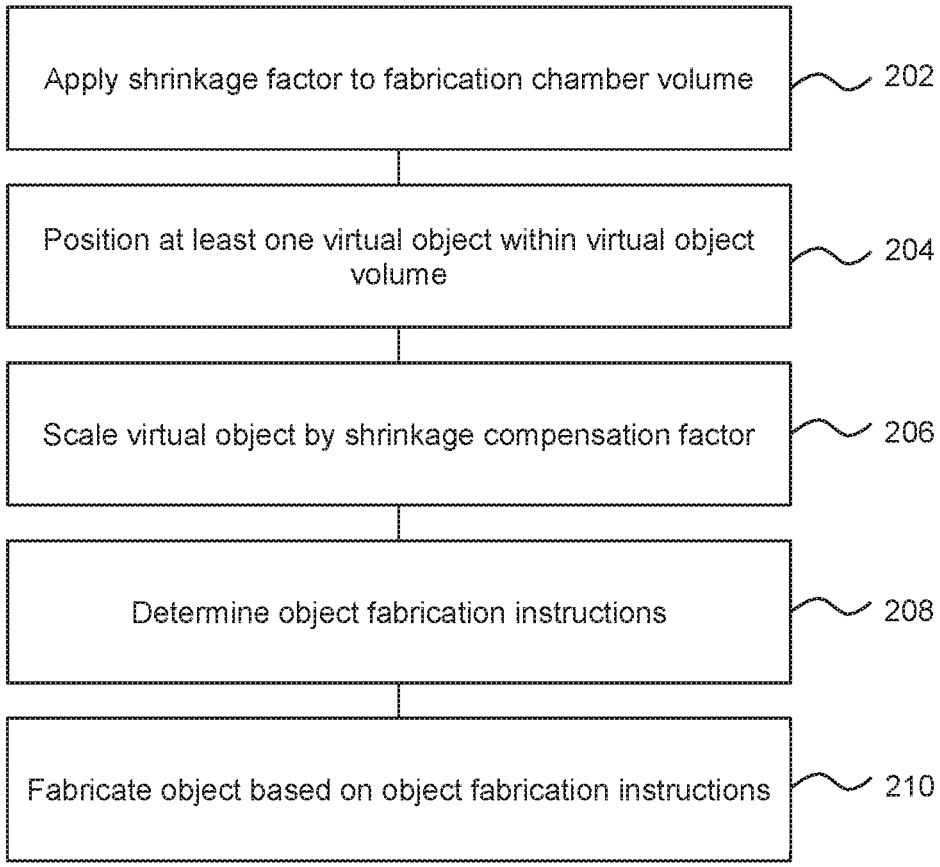
FIG. 2 is a flowchart of an example method of fabricating an object.

FIG. 2 comprises a method of fabricating an object in one example.

The method comprises, in block 202, applying a shrinkage factor to the fabrication chamber volume, the shrinkage factor being based on the determined build material characteristic, which in this example is the build material type. For example, for one build material, this may comprise an X % reduction in all dimensions, where X is between 0 and 15, or between 0 and 10, or between 0 and 5. In another example, the shrinkage may be non-symmetrical and some dimensions may be associated with a greater shrinkage than others. In one example the shrinkage factor may relate to the build material and a print agent, e.g. coalescing agent and/or coalescing modifier agent, used for the printing process. For example, a specific material may be known to shrink by a first factor in a first direction after or during printing, and therefore, in this example, the shrinkage factor may be the first factor in the first direction.

In one example, the shrinkage factor may comprise three shrinkage factors which can be used to scale in three orthogonal directions corresponding to the X, Y and Z directions. In other examples, the at least one shrinkage factor may comprise three shrinkage factors to be used to scale in any three orthogonal directions.

In some examples, the dimensions are predetermined. In other words, block 202 may be carried out in advance of the remaining blocks, and the 'pre-shrunk' object volume dimensions may be predetermined.

Block 204 comprises positioning at least one virtual object for object generation within the virtual object volume. In some examples, the placement of the virtual object may be automatic, for example comprising a 'batching' process which uses packing algorithms to make efficient use of the space within a fabrication chamber. In other examples, a user may specify a position (in some examples, visually placing a virtual object within a virtual object volume using a graphical user interface showing both the virtual object and the virtual object volume/chamber).

The virtual object may be defined using object model data, which may specify the geometric shape and/or properties and/or materials of the object to be generated therefrom.

Block 206 comprises scaling the virtual object by a shrinkage compensation factor. In other examples, the at least one compensation factor may be obtained from an additive manufacturing apparatus. For example, the amount of shrinkage expected for a particular type of material may be stored within a memory of an additive manufacturing apparatus and/or build material container, and the at least one compensation factor may be derived from this expected shrinkage.

In one example the compensation factor may relate to the build material and/or print agent, e.g. coalescing agent and/or coalescing modifier agent, used for the printing process. For example, a specific material may be known to shrink by a first factor in a first direction after or during printing (in some examples, when a particular print agent is used) and therefore, in this example, the shrinkage compensation factor may be the first factor in the first direction.

In one example, the compensation factor may comprise three compensation factors which can be used to scale in three orthogonal directions corresponding to the X, Y and Z directions. In other examples, the at least one shrinkage compensation factor may comprise three compensation factors to be used to scale in any three orthogonal directions.

In some examples, scaling is carried out with reference to an origin at a centre of the virtual object volume. In some such examples, the first allowable Z coordinate, where the z-axis is the vertical inter-layer axis, of printable content for that scaling factor is the same regardless of job size. This means that there is no need to add any unnecessary empty layers before the job content.

In contrast, if the scaling was applied from the centre of the object the first Z coordinate of printable content would change depending on the original size of the object being printed.

For example, if the at least one shrinkage compensation factor comprises a compensation factor A to be applied in an X direction, then the object model data would be enlarged by A in the X direction from the centre of the virtual object volume. In another example, if the at least one shrinkage compensation factor comprises three compensation factors, A, B and C, to be applied in the X, Y and Z directions, respectively, then the object model data would be enlarged by A in the X direction, B in the Y direction, and C in the Z direction from the centre of the virtual object volume.

Thus, it may be noted that the scaling described in relation to block 202 may result in decreasing the input dimensions (the dimensions of the fabrication chamber) whereas the scaling described in relation to block 204 may result in increasing the input dimensions (the dimensions of the model object(s)).

Block 208 comprises determining object fabrication instructions based on the scaled virtual object. Determining the instructions may comprise determining instructions for the placement of print agent on at least one layer of build material. For example, the pattern of fusing agent may be based on the shape of an object which it is intended to generate.

Block 210 comprises fabricating (generating or printing) the object based on the object fabrication instructions. For example this may be carried out in a fabrication chamber and/or on a print bed of an additive manufacturing apparatus.

In some examples, at least one of blocks 206 to 208 are carried out in processing circuitry of an additive manufacturing apparatus. In some examples, blocks 202 and 204 may be carried out by software deployed remotely from the additive manufacturing apparatus, for example via a web portal or interface. In some examples, these blocks may be executed as a web application, and/or via a web page.

Figure 3:
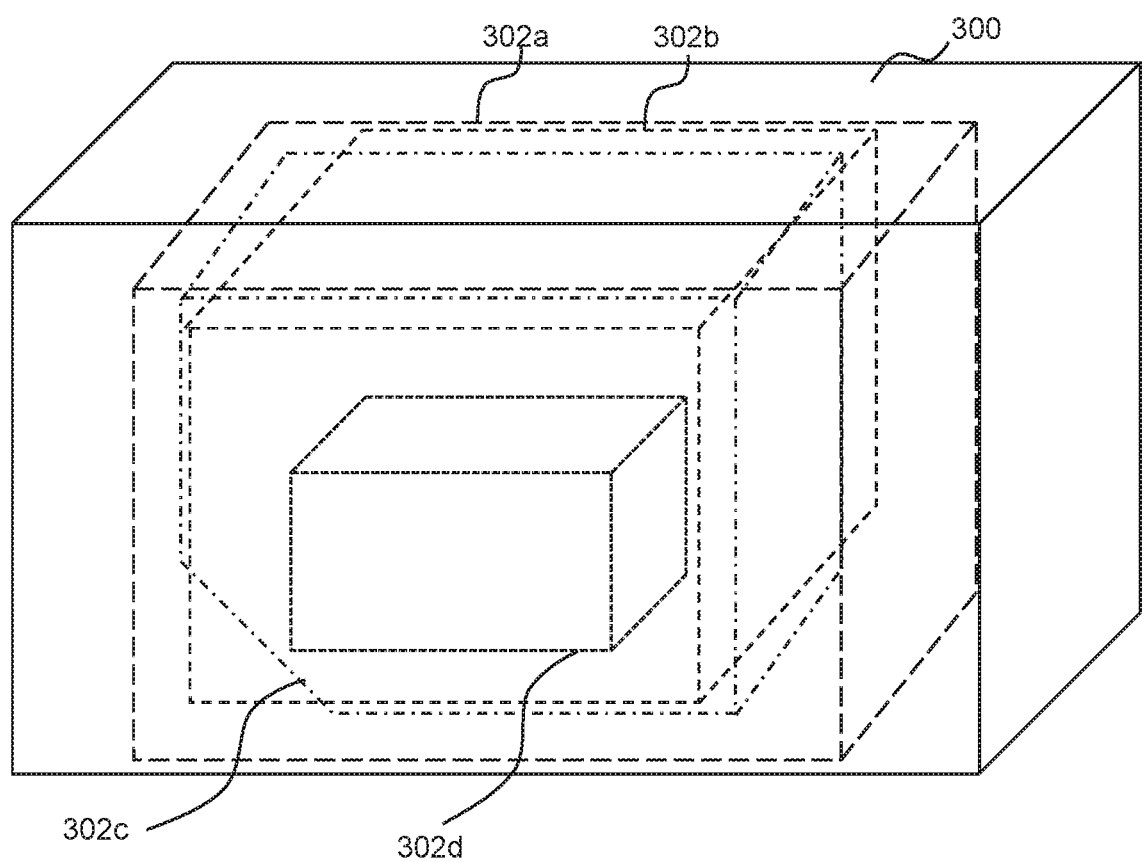
FIG. 3 is an example illustrating a fabrication chamber and a plurality of virtual object volumes.

FIG. 3 shows an example of a fabrication chamber 300, which may be intended for use by a particular object generation, or additive manufacturing, apparatus. The fabrication chamber may have dimensions which are specified by designating a corner of the fabrication chamber as the origin and specifying the location of the most distant corner therefrom using coordinates.

For example this may be specified as xml data, JSON data or the like.

In this example, the fabrication chamber is associated with four different virtual object volumes 302a-d, shown in dotted outline. The first virtual object volume 302a is associated with a first build material. The second virtual object volume 302b is associated with a second build material. The second build material is associated with a greater shrinkage than the first build material and therefore the second virtual object volume 302b is smaller than the first virtual object volume 302a.

The third virtual object volume 302c has a non-cuboid shape, effectively missing a corner region. In this example, the corner region is a counter-indicated fabrication zone based on the build material and/or characteristics of the physical build chamber (for example, those that cause non-uniform thermal losses and/or thermal gradients) and the virtual object volume is determined to exclude the counter indicated fabrication zone. This may for example comprise a region in which objects have been generated with a higher than acceptable incidence of faults or flaws.

The fourth virtual object volume 302d is smaller than the second virtual object volume 302b. In this example, the fourth virtual object volume 302d is associated with the same material as the second virtual object volume 302b, but a higher specified intended object quality. In such examples, the virtual object volume may be determined by determining a virtual boundary volume intended to be outside the virtual object volume, wherein the size of a boundary volume is determined based on the build material and the intended object quality. For example, as temperature gradients may be seen in regions close to the edges of a fabrication chamber, it may be intended to avoid such regions when a high quality (for example, low dimensional tolerance) is specified.

The dimensions may be specified using the coordinates of at least two corners. For example, the fabrication chamber 300 may be defined with an origin [0, 0, 0] and a second, opposite in all dimensions, corner as [450000, 350000, 427000] in microns.

The first virtual object volume 302a may be defined using the same origin by the coordinates [27000, 30000, 15820] and [423000, 320000, 398020] and the second virtual object volume 302b may be defined by the coordinates [50000, 40000, 16920] and [400000, 310000, 396920]. The fourth virtual object volume 302d may be defined in a similar manner.

As the third virtual object volume 302c has a more complex shape, additional vertices may be specified.

As outlined above, in some examples, a user may select a build material (and in some examples an intended object quality, e.g. draft, final, high precision, etc.) which may, for example, be presented as a selectable list, and may, as a result be presented with a matching one of the object volumes 302. In some examples in which a plurality of objects are being printed, the object volume 302 may be the object volume associated with the highest specified intended object quality.

Alternatively, the user may select an object volume 302, or the object volume may be automatically selected as being of a sufficient size to receive a predetermined one or more virtual objects, and the build material may be selected accordingly.

Figure 4:
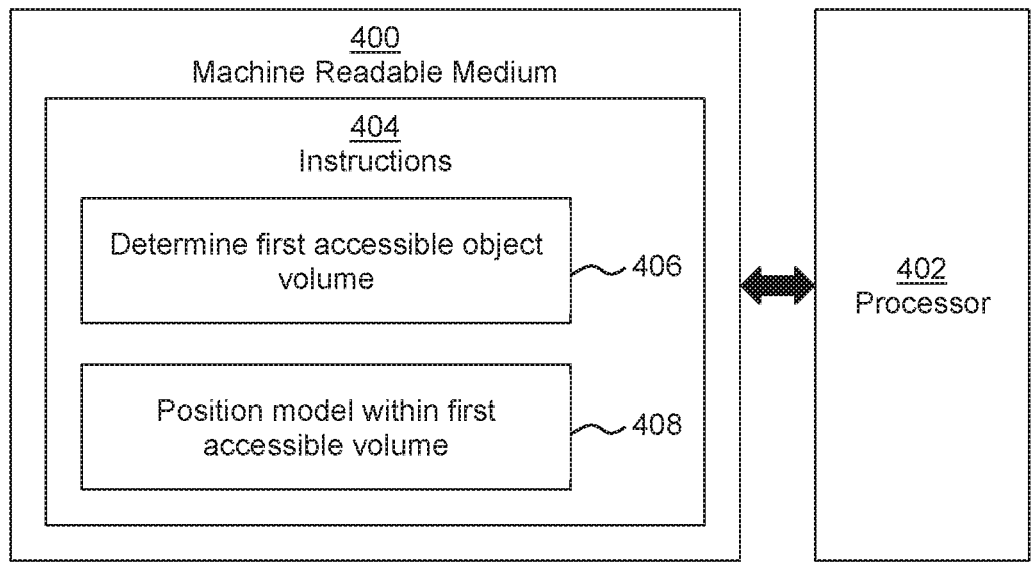
FIG. 4 illustrates an example of a machine readable medium in association with a processor.

FIG. 4 is an example of a tangible machine readable medium 400 associated with a processor 402. The machine readable medium 400 stores instructions 404, which may be non-volatile, and which, when executed by the processor cause the processor 402 to carry out a plurality of processes.

The instructions 404 comprise instructions 406 to cause the processor 402 to determine a first accessible object volume within a fabrication chamber of an additive manufacturing apparatus. The first accessible object volume is one of a plurality of accessible object volumes, each of the plurality of accessible object volumes being associated with one of a plurality of build materials and having different dimensions. In some examples, there may be more than one accessible object volume associated with a single build material. For example, there may be accessible object volumes associated with different variants of a build material, different quality specifications and the like. The first accessible volume may correspond to, or be used as the basis of, a virtual volume as described above. The accessible object volumes may be volumes which are available for placement of a model of the object bearing in mind subsequent model scaling that may be applied. In other words, the accessible object volumes may define virtual boundaries within which to position virtual objects representing objects to be generated in the fabrication chamber The instructions 404 further comprise instructions 408 to cause the processor 402 to position a model of an object to be generated within the first accessible volume.

In some examples, the instructions 404 further comprise instructions to cause the processor 402 to generate a virtual representation of the accessible object volume, and, in some examples, to display the position of the model of the object within the virtual representation of the accessible object volume. For example, this may be displayed on a display screen. In some examples, the display of the virtual representation may be provided as part of a web-based interface, for example by use of a web application.

In some examples, the instructions 404 further comprise instructions to cause the processor 402 to scale the object model to compensate for shrinkage in object generation, wherein the scaling may cause at least a portion of the scaled object model to extend beyond the accessible object volume. As has been set out above, in some examples, due to shrinkage on cooling, an object may shrink to be within the accessible object volume, even though when print agent was applied, this extended outside the accessible object volume.

Figure 5:
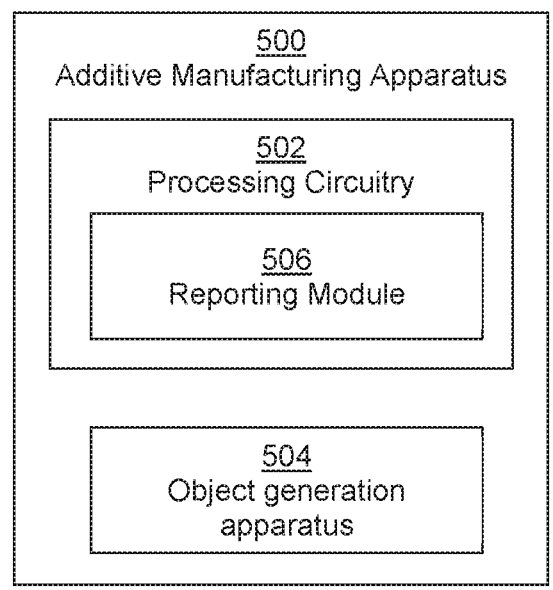
FIG. 5 illustrates an example of an additive manufacturing apparatus.

FIG. 5 is an example of an additive manufacturing apparatus 500 comprising processing circuitry 502 and object generation apparatus 504. The processing circuitry 502 comprises a reporting module 506, wherein the reporting module 506 is to report a plurality of accessible object volumes of the additive manufacturing apparatus, each of the plurality of accessible object volumes being associated with a build material and having different dimensions, wherein each of the accessible object volumes is smaller than an additive manufacturing apparatus fabrication chamber volume. These may be reported in a combined manner or in some examples individually or as subsets, for example once a build material for use has been identified. The accessible object volumes may be volumes which are available for placement of a model of the object, bearing in mind subsequent model scaling that may be applied. In other words, the accessible object volumes may define virtual boundaries within which to position virtual objects representing objects to be generated in the fabrication chamber.

The object generation apparatus 504 may, in use of the apparatus 500, generate an object in the additive manufacturing apparatus fabrication chamber volume. In some examples, the object generation apparatus 504 may comprise a controller to control one or more associated apparatus. In other examples, the object generation apparatus may for example comprise any or any combination of: a fabrication chamber, a print bed, print head(s) for distributing print agents, a build material distribution system for providing layers of build material, energy sources such as heat lamps, or any other apparatus for generating an object.

Figure 6:
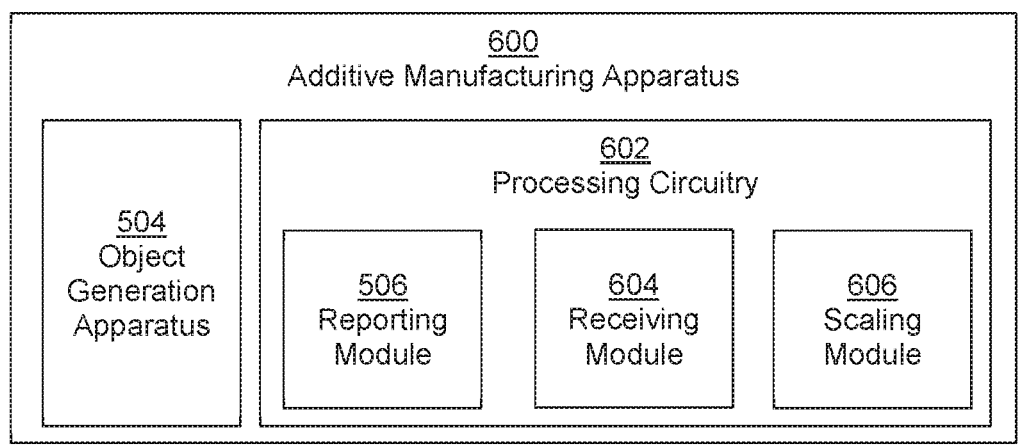
FIG. 6 illustrates another example of an additive manufacturing apparatus.

FIG. 6 is another example of an additive manufacturing apparatus 600 comprising processing circuitry 602 which, in addition to the object generation apparatus 504 and the reporting module 506 of FIG. 5 comprises a receiving module 604 and a scaling module 606.

In use of the apparatus 600, the receiving module 604 receives an indication of a virtual build volume comprising at least one virtual object arranged within the accessible object volume. For example, this may be received over an interface from user-facing software.

The scaling module 606, in use of the apparatus 600, scales the content of the virtual build volume to compensate for shrinkage during object generation.

In this example, the reporting module 506 is to report a plurality of accessible object volumes of the additive manufacturing apparatus which are associated with different build materials. In addition, the reporting module 506 is to report a plurality of accessible object volumes of the additive manufacturing apparatus which are associated with one of a plurality of build materials and at least one of a counter-indicated fabrication chamber zone and an object generation quality indication.

The additive manufacturing apparatus 500, 600 may further comprise additional components not shown herein, for example a fabrication chamber, a print bed, print head(s) for distributing print agents, a build material distribution system for providing layers of build material, energy sources such as heat lamps and the like, which are not described in detail herein.

The processing circuitry 502, 602 may carry out at least one of the blocks of FIG. 1 or FIG. 2.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus (such as the reporting module 506, the receiving module 604 and the scaling module 606) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims, in any combination.

The invention claimed is:

1. A method comprising:
   receiving, at a processor, an indication of a volume of a fabrication chamber;
   determining, by a processor, a characteristic of a build material for use in fabricating one or more objects within the fabrication chamber;
   based on the build material characteristic, scaling, by a processor, a fabrication chamber volume to obtain a virtual object volume, wherein the virtual object volume provides a virtual boundary within which to position unscaled virtual objects representing the objects to be generated in the fabrication chamber, prior to shrinkage of the unscaled virtual objects;
   positioning, by the processor, at least one of the virtual objects within the virtual object volume for corresponding physical generation of at least one corresponding of the objects;
   determining, by the processor, object generation instructions based on the at least one of the virtual objects as positioned within the virtual object volume; and
   causing, by the processor, the at least one corresponding of the objects to be physically generated in accordance with the object generation instructions.

2. The method according to claim 1, wherein the virtual object volume is determined by applying a shrinkage factor to the fabrication chamber volume, the shrinkage factor being based on the determined build material characteristic.

3. The method according to claim 2, further comprising:
   scaling at least one of the the virtual object by a shrinkage compensation factor,
   wherein the object fabrication instructions are further determined based on the at least one of the virtual objects as scaled.

4. The method according to claim 1, further comprising:
   determining, by the processor, at least one counter-indicated fabrication zone,
   wherein the virtual object volume is determined to exclude the counter-indicated fabrication zone.

5. The method according to claim 1, further comprising:
   determining, by the processor, an intended object quality,
   wherein the virtual object volume is determined by determining a virtual boundary volume intended to be outside the virtual object volume,
   and wherein a size of the virtual boundary volume is determined based on the build material and the intended object quality.

6. A non-transitory machine readable medium storing instructions that when executed by a processor cause the processor to:
   determine a first accessible object volume within a fabrication chamber of an additive manufacturing apparatus, wherein the first accessible object volume is one of a plurality of accessible object volumes, each of the plurality of accessible object volumes being associated with one of a plurality of build materials and having different dimensions;
   generate a virtual representation of the first accessible object volume;

position a model of an object to be generated within the first accessible object volume;

display the model of the object within the virtual representation of the accessible object volume, wherein the model of the object is first positioned and then displayed with intended dimensions of the object after shrinkage;

determine object generation instructions based on the model of the object as positioned within the first accessible object volume; and cause the object to be physically generated in accordance with the object generation instructions.

7. The non-transitory machine readable medium according to claim 6, wherein the instructions when executed by the processor cause the processor to further:

scale the object model to compensate for shrinkage in object generation, wherein the scaling may cause at least a portion of the scaled object model to extend beyond the first accessible object volume.

8. An additive manufacturing apparatus comprising:

a processor; and a memory storing instructions executable by the processor to:

report a plurality of accessible object volumes of the additive manufacturing apparatus, each of the plurality of accessible object volumes being associated with a build material and having different dimensions, wherein each of the accessible object volumes is smaller than an additive manufacturing apparatus fabrication chamber volume;

receive an indication of a virtual build volume comprising a virtual object arranged within an accessible object volume selected from the plurality of accessible object volumes based on a selected build material of an object to be generated, wherein the virtual object has intended dimensions of the object after shrinkage; and cause the object to be generated in the additive manufacturing apparatus fabrication chamber volume in correspondence with arrangement of the virtual object within the accessible object volume.

9. The additive manufacturing apparatus according to claim 8, wherein the instructions are executable by the processor to further:

scale a content of the virtual build volume to compensate for the shrinkage during object generation.

10. The additive manufacturing apparatus according to claim 8, wherein the instructions are executable by the processor to further:

report the plurality of accessible object volumes of the additive manufacturing apparatus which are associated with different build materials.

11. Additive The additive manufacturing apparatus according to claim 8, wherein the instructions are executable by the processor to further: reporting module is to report the plurality of accessible object volumes of the additive manufacturing apparatus that are associated with the build material of one of the plurality of accessible object volumes and either or both of a counter-indicated fabrication chamber zone and an object generation quality indication.

12. The method according to claim 1, wherein the virtual object volume is smaller than the volume of the fabrication chamber and limits a volume within the fabrication chamber in which objects are to be generated.

13. The method according to claim 1, wherein the build material characteristic comprises a characteristic of the build material when used with a particular print agent.

14. The method according to claim 1, further comprising:

determining, by the processor, a first virtual object volume in response to selection of a first build material having a first build material characteristic; and determining, by the processor, a second virtual object volume, that is smaller than the first virtual object volume, in response to selection of a second, different build material having a second build material characteristic.

15. The method according to claim 2, wherein the shrinkage factor comprises a different shrinkage factor for different orthogonal directions of the fabrication chamber volume.

16. The method according to claim 2, further comprising:

after applying the shrinkage factor to the fabrication volume, applying, by the processor, the shrinkage factor to the at least one of the virtual objects representing the at least one corresponding of the objects to be generated in the fabrication chamber.

17. The additive manufacturing apparatus of claim 8, further comprising:

an object generation apparatus to physically generate the object in accordance with the object generation instructions.

* * * * *